Sept. 19, 1950 K. O. ENGNELL ET AL 2,522,934
HITCH FOR TRACTORS AND ATTACHMENTS
Filed Jan. 26, 1948 3 Sheets-Sheet 1
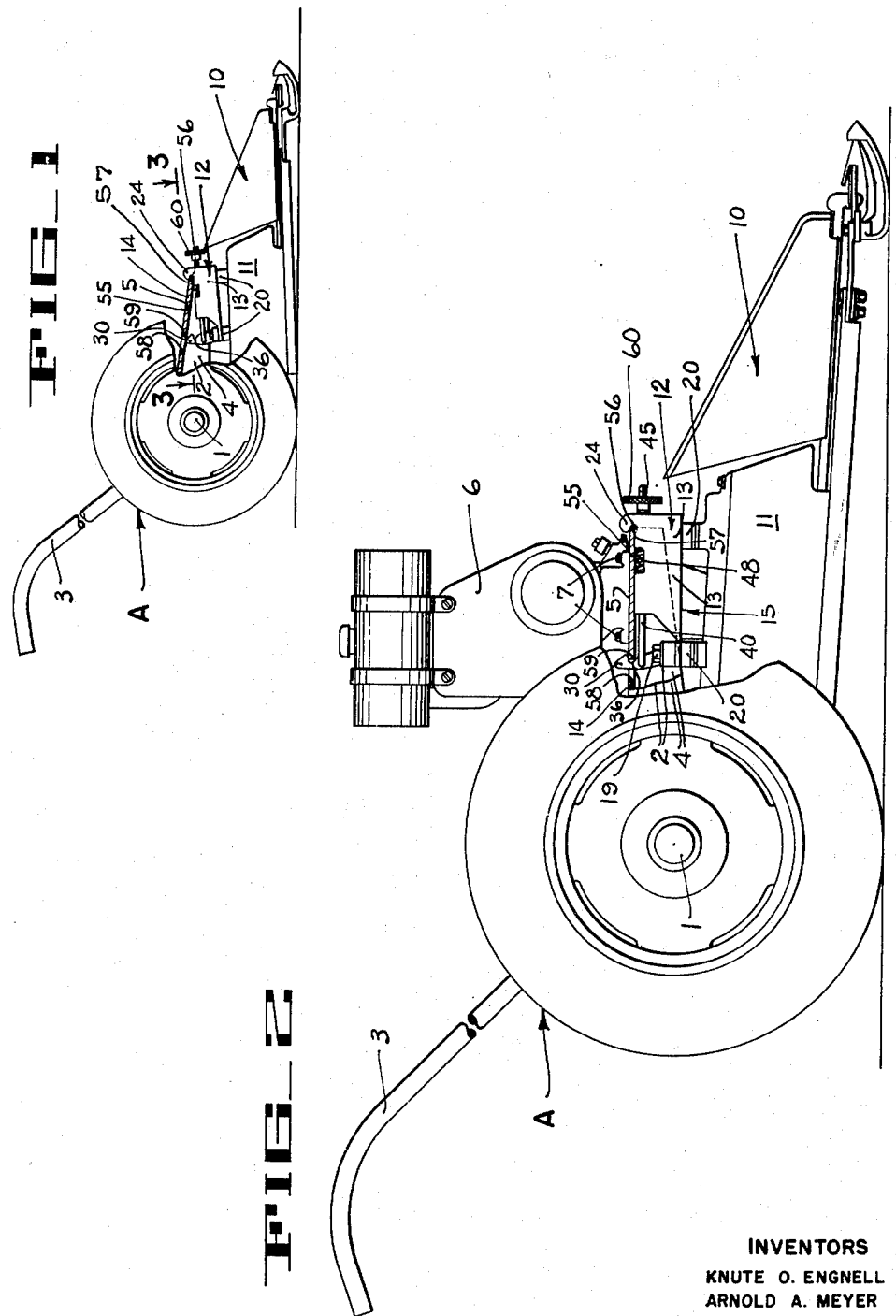
INVENTORS
KNUTE O. ENGNELL
ARNOLD A. MEYER
BY Philip A. Minnis
Hans G. Hoffmeister
ATTORNEYS Sept. 19, 1950      K. O. ENGNELL ET AL      2,522,934
HITCH FOR TRACTORS AND ATTACHMENTS
Filed Jan. 26, 1948      3 Sheets-Sheet 2
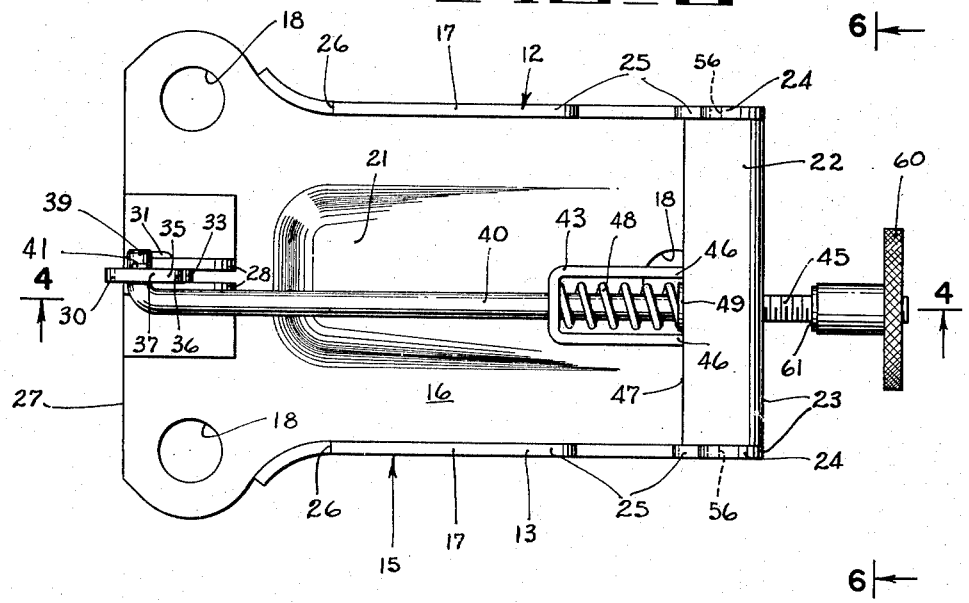
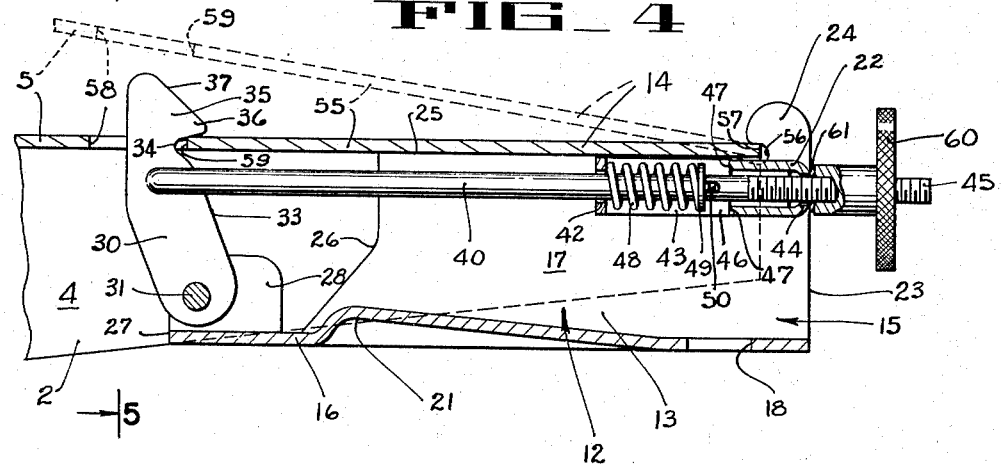
INVENTORS
KNUTE O. ENGNELL
ARNOLD A. MEYER
BY Philip A. Minnis
Hans G. Hoffmeister
ATTORNEYS Sept. 19, 1950   K. O. ENGNELL ET AL   2,522,934
HITCH FOR TRACTORS AND ATTACHMENTS
Filed Jan. 26, 1948   3 Sheets-Sheet 3
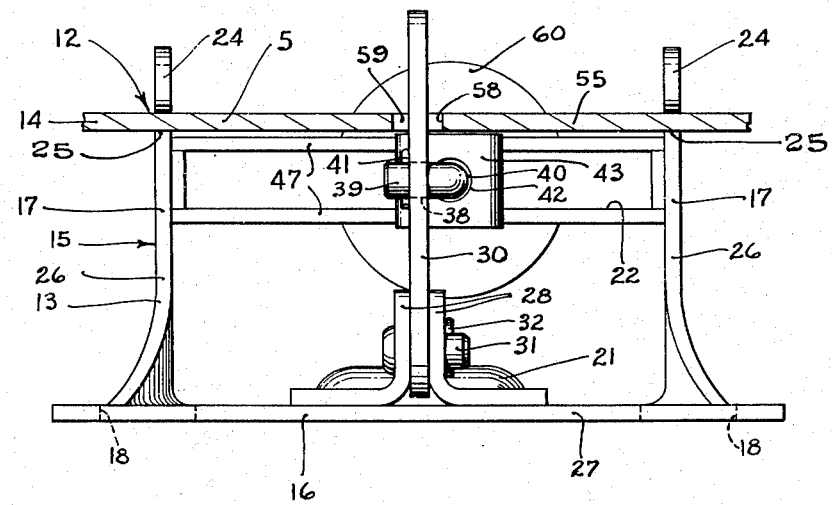
FIG_5
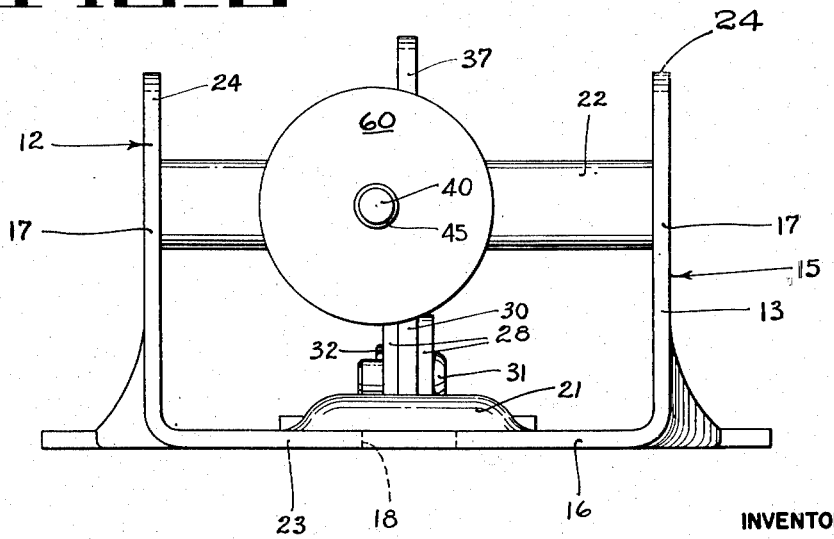
FIG_6
INVENTORS
KNUTE O. ENGNELL
ARNOLD A. MEYER
BY Philip A. Minnis
Hans G. Hoffmeister
ATTORNEYS Patented Sept. 19, 1950

2,522,934

UNITED STATES PATENT OFFICE 2,522,934

HITCH FOR TRACTORS AND ATTACHMENTS

Knute O. Engnell and Arnold A. Meyer, Port Washington, Wis., assignors to Food Machinery and Chemical Corporation, a corporation of Delaware Application January 26, 1948, Serial No. 4,388

17 Claims. (Cl. 56—26.5)

This invention relates to a hitch and more particularly to a hitch for quickly coupling various kinds of implements to a tractor.

With the advent of tractor driven farm and garden implements various types of couplings whereby such implements could readily be attached to or detached from a tractor have been devised. Some tractors are so constructed as to be suitable for pulling the implements but with other tractors it is necessary, as well as desirable, that the implement be attached to the front of the tractor so as to be pushed along forwardly thereof.

The present invention is adapted to be used in either of the foregoing cases and is especially suitable for front mounted attachments such as plowing, hoeing, seeding, and mowing implements, or the like.

One object of the present invention is to provide a quick-hitch between the implement and the tractor so that upon movement of the tractor into initial engagement with a portion of the implement the two can be connected by simply tilting the tractor in a particular manner.

Another object is to provide severable elements on the tractor and implement, respectively, which elements are adapted to automatically interlock with each other when they are brought together.

Another object is to provide a tractor and an implement to be driven thereby with a coupling adapted to be automatically latched upon movement of the tractor and implement into engagement with each other.

Another object is to provide a simple, inexpensive, and efficient quick acting coupling for connecting detachable implements together.

Other objects and advantages of the present invention will appear more fully from the following description and the accompanying drawings in which:

Fig. 1 is a side elevational view of the hitch of the present invention illustrating the same in connection with an implement about to be connected to a tractor.

Fig. 2 is similar to Fig. 1, at a larger scale, illustrating the tractor and implement coupled for operation.

Fig. 3 is a top view of one portion only of the hitch shown in Fig. 1 and taken substantially along line 3—3 thereof.

Fig. 4 is a section taken along line 4—4 in Fig. 3 but showing both portions of the hitch interconnected in the manner as illustrated in Fig. 2.

Fig. 5 is an end view of the hitch taken along line 5—5 in Fig. 4.

Fig. 6 is an end view of the portion of the hitch shown in Fig. 3 and taken along line 6—6 thereof.

The present invention has been illustrated in Figs. 1 and 2 in connection with a simple conventional two-wheeled garden tractor A comprising an axle 1, carrying a frame or chassis 2 from which a pair of handles 3 extend rearwardly and upwardly. The chassis 2 includes a pair of forwardly extending arms 4 to the upper edges of which a platform 5 is secured in any suitable manner.

The platform 5 may, if desired, support an internal combustion engine 6 which may be secured to the platform by bolts 7 in the manner shown in Fig. 2. Since the mode of driving the tractor forms no part of the present invention, it is not deemed necessary that the drive feature be specifically described. It is believed sufficient to a clear understanding of this invention to say that the tractor is a mobile unit, completely under the control of the person operating the same, for effecting operation and use of an implement connected to the tractor.

An implement with which the tractor A is adapted to be associated is generally indicated at 10 in Figs. 1 and 2 illustrating a demountable frame 11 carrying a sickle bar type of mowing tool. Since the present invention is adapted for attaching different types of tools, such as cultivators, mowers, spray rigs, and plows, or the like, to a tractor, it will be understood that the demountable frame associated with such various tools may differ in form from the one illustrated herein. For purposes of the present invention, the demountable frame need only be constructed in such a manner as to support one portion of a hitch 12 in such a position above the ground that it will be engaged by the other portion of the hitch on the tractor when the latter is rolled into coupling relation with the implement to transmit the towing stress in thrust from the tractor to the ground engaging implement.

One portion 13 of the hitch 12 comprises a channel 15 having a web or plate 16 provided with upstanding side flanges or walls 17. The plate 16 is provided with a plurality of holes 18 through each of which a bolt 19 extends for securing the channel 15 to mounting bosses 20 provided on the frame 11. The plate 16 is provided with a stamped depression 21 for rigidifying the web of the channel 15 and the upstanding walls 17 of the channel are secured by welding, or the like, to the ends of a U shaped cross bar 22. The cross bar 22 is preferably secured adjacent the forward end 23 of the channel 15 and adjacent upstanding hook formations 24 at the upper edges 25 of the walls 17.

The upper edges 25 of the walls 17 extend rearwardly from the hooks 24, parallel to the plate 16 and are preferably cut away, as shown at 26, to permit access to the heads of the bolts 19 adjacent the rearward end 27 of the channel. A pair of spaced upstanding ears 28 is secured to the plate 16, preferably centrally of the channel adjacent the rearward end 27 thereof. A latch hook or arm 30 is disposed between the ears 28 and is pivotally connected to the same by a headed pin 31. The headed pin 31 has a cotter key 32 transversely of its extended end for retaining the pin upon the ears 28 so as to support the arm 30 for pivotal movement with respect to the channel 15.

The arm 30 is adapted to extend upwardly beyond the upper edges 25 of the side walls 17 of the channel and one edge 33 of the arm is provided with a notch 34 adapted to be disposed above the upper edge 25 of walls 17, i. e., opposite the hook formations 24 thereof, when the arm is supported in a substantially upright position. The arm 30 is provided with an extended nose portion 35 above the notch 34, the notch and nose constituting a latch hook 36 provided with a cam edge 37 along the upper side wall of the nose. The arm 30 has a hole 38 adjacent and slightly below the notch 34 and a pintle 39 on the bent end of a latch locking rod 40 extends through the hole 38 and is retained in pivotal connection with the arm by a cotter pin 41 extending through the free end of the pintle.

The rod 40 extends forwardly from the arm 30 and projects through an opening 42 in a yoke 43 and through another opening 44 in the U shaped cross bar 22 so that the threaded end 45 of the rod extends beyond the crossbar. The legs 46 of the yoke 43 are welded to the edges 47 of the flanges of the U shaped cross bar 22 so as to support the rod 40 for reciprocating movement longitudinally of the channel 15. A compression spring 48 surrounds the rod 40 within the yoke 43 and abuts a washer 49 mounted on the rod. A cotter pin 50 is disposed in a hole in the rod 40 for maintaining the washer 49 against one end of the spring 48 and the opposite end of the spring against the base of the yoke 43. When the spring 48 expands, it urges the washer 49 toward the cross bar 22 to shift the rod 40 and thereby pull the arm 30 into substantially upright position, Fig. 1.

The other portion 14 of the hitch 12 comprises a flat plate 55 and for purposes of the present disclosure the plate 55 is the mid portion of the platform 5 of the tractor chassis 2 referred to above. In Fig. 1, the implement 10 is shown resting upon the ground and it will be noted that the portion 13 of the hitch on the frame 11 is slightly canted with respect to horizontal so that the hook formations 24 adjacent the forward end 23 of the channel 15 are disposed at a higher plane than the balance of the portion 13 of the hitch. It will also be noted that the upper edge 25 of each of the side walls 17 of the channel 15 are cut away adjacent the hook formations 24 to provide a deep notch 56 in connection with the hook formations 24. Although the cross bar 22 partially overlaps the base of the notch 56 it will be noted that the remaining portion thereof extends below the upper edges 25 of the walls 17. It is, therefore, apparent that the hook formations 24 are so disposed as to be accessible for connection with the other portion 14 of the hitch in a manner now to be explained.

When the person operating the tractor A moves the tractor toward the implement 10 for connection therewith, he tilts the handles 3 slightly upwardly so that the forward edge 57 of the plate 55 will enter the notches 56 of the hook formations 24 in the manner shown in Fig. 1, see also the dotted line indication of the plate 55 in Fig. 4. Thereafter, a sudden downward thrust upon the handles 3 will tilt the plate 55 upwardly lifting the hook formations 24 to thereby raise the frame 11 from the ground. The frame of the implement 10 is so constructed that it is heaviest at its tool supporting end and consequently when the frame 11 is raised by the hook formations 24, they act as a fulcrum. It is, therefore, apparent that as the chassis 2 is tilted counterclockwise (Figs. 1 and 2) the frame is so balanced as to cause the hitch portions 13 and 14 to swing toward each other.

It is clearly apparent from the illustration of Fig. 1 that with the parts in the positions there illustrated a forward driving torque applied to the tractor wheels would, by the thrust thus applied to the leading edge of the plate 55, tend to push the channel hook formations 24 forwardly. However, since the implement 10 rests on the ground, this ground engagement of the implement would produce a relatively rearward drag at ground level, or below the line of thrust of the thrusting edge of the plate 55. The resultant of these two forces would produce a swinging movement of the two hitch parts toward each other about the interengaged thrusting or force-transmitting edge of the plate 55, and the channel hook formations 24 as a fulcrum in the same manner as set forth in the preceding paragraph, thereby swinging the hitch portions 13 and 14 together about this fulcrum until they are brought into abutting relation with each other as shown in Fig. 2. The abutting of the two hitch units of course arrests their swinging movement, and, together with the interhooked relation of the forward edge of the member 55, interlocks the units together.

The plate 55 is provided with a slot 58 adapted to register with the upper extremity of the arm 30. However, it will be noted that the slot 58 is so disposed relative to the edge 57 of the plate 55 that an edge 59 of the latter, within the slot 58, engages the cam edge 37 on the arm 30 to thereby rock the latter (counterclockwise Fig. 1) against the action of the compression spring 48. The arm 30 is thereby urged into registration with the slot 58 until the nose portion 35 of the arm passes the edge 59 of the plate 55 whereupon the compression spring 48 expands and pulls the rod 40 and arm 30 back toward normal position so that the hook 36 of the arm latchingly engages the upper surface of the plate 55. The nose portion 35 of the arm 30 will now extend over the edge 59 of the plate 55 to press the latter downwardly upon the upper edges 25 of the side walls 17 of the channel 15. Consequently, the plate 55 will be gripped between the latch arm 30 and the hook formations 24 of the portion 13 of the hitch.

Since the latch arm 30 is disposed along the longitudinal center of the channel 15, it is apparent that the plate 55 will be pressed with equal force into the notches 56 of the spaced hook formations 24 and, therefore, the implement will be securely held in operative position with respect to the tractor A.

As a safety measure, a threaded hand operated wheel 60 is provided on the threaded end 45 of the rod 40 and this wheel is adapted to be turned until a washer 61 at its inner end abuts the cross bar 22. In this manner, the rod 40 and arm 30 are drawn toward the cross bar to thereby secure the plate 55 between the hook 36 and hook formations 24 and in firm contact with the upper edges 25 of the portion 13 of the hitch. With the implement thus secured to the tractor A, it is apparent that the engine 6 may be connected to the implement 10, as, for instance, by a flexible belt (not shown) for operating the sickle bar or whatever other tool is used in connection with the tractor.

When the implement 10 is to be detached from the tractor, the hand wheel 60 is loosened to withdraw the same far enough from the cross bar 22 to permit the rod 40 to shift a substantial distance relative to the channel 15 when a force is applied against the hook 36. The tractor A is then jerked backwardly so that the edge 59 of the plate 55 is thrust against the hook 36 causing the arm 30 to swing backward (counterclockwise Fig. 4) against the action of the compression spring 48. In this manner, the forward edge 57 of the plate 55 will be withdrawn from the notches 56 in the hook formations 24, i. e., out of supporting engagement with the hook formations so that the forward end of the implement will drop relative to the tractor chassis. Thereafter, a slight forward motion of the tractor will disengage the plate 55 from the hook 36 to permit the rearward end of the implement 10 to drop out of engagement with the tractor chassis so that the tractor may be rolled away from the implement.

It will be apparent that the two portions 13 and 14 of the hitch 12 may be inverted with respect to each other, that is, the channel 15 may be suspended from the platform 5 and the plate 55 formed as a part of the frame 11 of the implement 10 whereby a quick-hitch may be established between implement and tractor in a manner similar to that explained above. Moreover, while the present invention has been specifically described herein, it will be apparent that the same is susceptible of various modifications and alterations without departing from the scope of the invention. We, therefore, desire to avail ourselves of all variations, modifications, and alterations coming within the purview of the appended claims.

What we claim as new and desire to protect by Letters Patent is:

1. A hitch for connecting a tractor unit to a tool unit comprising means on one of said units providing spaced thrusting and latching edges, means on said other of said units provided with a hook formation for receiving the thrusting edge, and a yieldable latch hook on said other of said units engageable by said latching edge for movement of said latch hook into latched engagement with said latching edge.

2. A hitch for connecting a tractor unit to a tool unit comprising means on one of said units providing spaced thrusting and latching ledges, means on said other of said units provided with a hook formation for receiving one of said ledges, a yieldable latch hook on said other of said units engageable by said latching ledge for movement of said latch hook into latching engagement with said latching ledge, and means for securing said latch hook in latching engagement with said latching ledge.

3. A hitch for connecting a tractor unit to a tool unit comprising means on one of said units providing a thrusting edge and a latching edge spaced from each other, means on the other of said units having hook formations adapted to receive said thrusting edge to provide a fulcrum about which said units may be swung for movement toward each other by application of a towing thrust thereto, and a yieldable hook associated with said means on the other of said units for camming engagement with said latching edge when said units are swung toward each other and for cooperating with said hook formations for securing said units together.

4. A hitch for coupling a tractor unit to a tool unit comprising means on one of said units having a thrusting edge and an oppositely directed latching edge spaced from each other, means on the other of said units having a hook formation adapted to receive said thrusting edge to transmit a towing force and to provide a fulcrum by which said two units are interlocked for swinging movement toward each other, a yieldable latch hook mounted on the other of said units for camming engagement with said latching edge when said two units are swung toward each other about said fulcrum and for latchingly engaging said latching edge, and means for securing said latch hook in latching engagement with said latching edge and for maintaining said leading edge in engagement with said hook formation.

5. A quick hitch comprising a plate having a thrusting edge and a latching edge spaced from each other, a second plate having a hook formation adapted to receive the thrusting edge of said first plate to transmit a towing force and to provide a fulcrum for pivotally connecting said plates for swinging movement toward each other, a latch hook mounted on said second plate, means for yieldably supporting said latch hook in a position for camming engagement with the latching edge of the first plate when said two plates are swung toward each other and for effecting latching engagement of said latch hook with said first plate when the same is contiguous to said second plate, and means associated with said latch hook supporting means for rendering said latch hook unyieldable to thereby secure said latch hook in latching engagement with the latching edge of said first plate.

6. A tractor hitch comprising a unit having spaced thrusting and latching edges, a channel disposed with its flanges extending toward said unit, a hook on each flange of said channel adjacent one end thereof for receiving the leading edge of said unit in thrust to provide a fulcrum for swinging movement of said hitch unit toward said channel, a yieldable latch hook mounted adjacent the other end of said channel for pivotal movement in a plane longitudinally of said channel, said latch hook being adapted to yield under engagement with the latching edge of said unit when the latter is swung toward the flanges of said channel and for cooperating with said channel hook formations for securing said unit against the flanges of said channel.

7. A tractor hitch comprising a unit having spaced thrusting and latching edges, a channel having hook formations transversely of said channel on the edges of its flanges for receiving the leading edge of said unit in thrust to provide a fulcrum during endwise movement of said channel and said unit toward each other to swing said unit and said channel toward abutment with each other, a latch hook pivotally mounted on said channel a substantial distance longitudinally thereof from said hook formations and adapted to latchingly engage the latching edge of said unit, and means for normally urging said latch hook toward the latching edge of said unit for maintaining the leading edge of said unit in engagement with the hook formations of said channel.

8. A tractor hitch comprising a plate having spaced thrusting and latching edges, a channel having hook formations transversely disposed with respect to each other on opposite flanges of said channel for receiving the thrusting edge of said plate to provide a fulcrum about which said plate and channel may be swung toward one another, a yieldable latch hook mounted on the web of said channel and engageable by the latching edge of said plate during movement of the latter toward said channel for permitting said plate to swing into engagement with the flanges of said channel and for cooperating with said channel hook formations to secure said plate in engagement with the flanges of said channel.

9. A hitch for connecting a tool unit to a tractor unit comprising a platform on one of said units provided with spaced leading and latching edges, a channel on the other of said units having a pair of flanges provided with hook formations adapted to receive the leading edge of said platform to support said platform for swinging movement toward said channel, a yieldable latch hook pivotally mounted on said channel for engaging the latching edge of said platform when the latter is swung toward said channel for permitting said platform to lie against the edges of said flanges, and means for securing said yieldable latch hook in latched relation with the latching edge of said platform.

10. A hitch for connecting a mobile power unit and a unit adapted to be attached thereto for propulsion thereby, comprising a hitch portion secured to one of said units having an endwise directed edge and a latching edge spaced from each other, a channel secured to the other of said units with its side flanges disposed for connection with said hitch portion, a hook on each of the flanges of said channel adjacent one end thereof for receiving said endwise directed edge of said hitch portion as a fulcrum for swinging movement of said channel toward said hitch portion, a yieldable latch hook mounted adjacent the other end of said channel and adapted to be engaged by the latching edge of said hitch portion when the latter is swung toward the flanges of said channel and for cooperating with said channel hooks for securing said hitch portion against the flanges of said channel, and means for securing said yieldable latch hook in latching engagement with the latching edge of said hitch portion.

11. A quick hitch for connecting a tool unit to a tractor unit comprising a platform secured to one of said units having a leading edge and a latching edge, a channel secured to the other of said units with its flanges disposed to be engaged by said platform, a pair of hooks on said channel for receiving the leading edge of said platform in thrust to provide a fulcrum for swinging movement of said platform and said channel toward each other, a latch arm pivotally mounted on said channel in spaced relation therealong with respect to said channel hooks, said latch arm having a hook formation adapted to engage the latching edge of said platform as the latter is swung toward said channel, and means between said latch arm and channel for yieldably supporting said latch arm in a position for engagement by the latching edge of said platform and for cooperating with said pair of channel hooks for securing said platform firmly against the free edges of the flanges of said channel.

12. A hitch for connecting a tool unit to a tractor unit comprising a platform secured to one of said units provided with a leading edge and a latching ledge, means secured to the other of said units including a pair of projections having parallel edges adapted to have engagement with said platform, each of said projections having a hook formation for receiving the leading edge of said platform, means between said projections providing a guideway parallel to the edges thereof, a rod slidable in said guideway, a latch member movably mounted between said projections and connected to said rod for movement therewith, and means between said rod and said means providing the guideway for urging said rod and latch member in a predetermined direction for engagement of said latch member with the latching ledge of said platform for permitting movement of said platform against and into engagement with the parallel edges of said projections and for securing the projections and platform together.

13. A tractor hitch comprising a longitudinally disposed channel having endwise opening hook formations projecting from the free edges of its flanges, a hitch portion having spaced endwise directed edges one of which is adapted to fit in thrust into the hook formations of said channel whereby the channel and hitch portion will be related for swinging movement toward each other, a latch hook pivotally mounted on said channel a substantial distance therealong from said channel hook formations for engagement by the other edge of said hitch portion, a cross bar secured at its ends to the flanges of said channel provided with a passage, a yoke carried by said cross bar and provided with a passage in alignment with the passage on said cross bar, a rod extending through said passages for reciprocating movement and having one end thereof pivotally connected to said latch hook, and a spring between said yoke and cross bar and operatively connected to said rod for releasably urging said latch hook into latching position for permitting the latter to pass said other edge of said hitch portion and for effecting engagement between said channel hook formations and the first named edge of said hitch portion.

14. A tractor hitch comprising a channel having hook formations projecting from the free edges of its flanges, a plate having a latching ledge and a thrusting edge spaced from each other, the thrusting edge being adapted to fit into the hook formations of said channel whereby the channel and plate will be related for swinging movement toward each other, a latch hook pivotally mounted on said channel a substantial distance therealong from said channel hook formations for engagement by the latching ledge provided on said plate, a cross bar secured at its ends to the flanges of said channel and provided with a passage, a yoke carried by said cross bar and provided with a passage in alignment with the passage on said cross bar, a rod extending through said passages for reciprocating movement and having its free end threaded and its opposite end pivotally connected to said latch hook, a spring on said rod between said yoke and cross bar and operatively connected to said rod for urging said latch hook into latching engagement with the latching ledge of said plate when said plate is contiguous to said channel, and means threaded on the free end of said rod for engaging said cross bar for securing said latch hook in latching engagement with the latching ledge of said plate.

15. A two unit hitch comprising a pair of hitch units one of which is adapted to be secured to a tractor, and one to a ground engaging implement, a first of said units having a thrust transmitting portion thereon, the second of said units having hook formation adapted to receive the thrust transmitting portion of the first hitch unit in thrust as a fulcrum for swinging the two hitch units toward abutting interlocked relation with each other, a latching ledge on one of said units spaced, in such interlocked relation of said hitch units, from said thrust transmitting portion, and a biased latch member acting between the two hitch units in such interlocked relation of said units releasably to retain said units in such relation.

16. An arrangement according to claim 15 wherein the latch member is adapted to overlie and latchingly engage the latching ledge, said latch member being biased in a direction to urge the thrusting edge toward the hook formation.

17. An arrangement according to claim 15 wherein a positive acting lock member is mounted releasably to secure the latch member in biased latching condition.

KNUTE O. ENGNELL.
ARNOLD A. MEYER.

REFERENCES CITED

The following references are of record in the file of this patent:

UNITED STATES PATENTS

| Number | Name | Date |
|---|---|---|
| 1,879,052 | Bounds | Sept. 27, 1932 |
| 2,368,290 | Donald | Jan. 30, 1945 |
| 2,374,533 | Fulton | Apr. 24, 1945 |